United States Patent
Mair

(10) Patent No.: US 10,981,785 B2
(45) Date of Patent: Apr. 20, 2021

(54) INSTALLATION AND METHOD FOR CARBON RECOVERY AND STORAGE, WITHOUT THE USE OF GAS COMPRESSION

(71) Applicant: Christian Mair, Innsbruck (AT)

(72) Inventor: Christian Mair, Innsbruck (AT)

(*) Notice: Subject to any disclaimer, the term of this patent is extended or adjusted under 35 U.S.C. 154(b) by 112 days.

(21) Appl. No.: 16/096,707

(22) PCT Filed: Apr. 28, 2017

(86) PCT No.: PCT/EP2017/000533
§ 371 (c)(1),
(2) Date: Oct. 26, 2018

(87) PCT Pub. No.: WO2017/186352
PCT Pub. Date: Nov. 2, 2017

(65) Prior Publication Data
US 2019/0135624 A1    May 9, 2019

(30) Foreign Application Priority Data
Apr. 28, 2016  (AT) .................................. A 221/2016

(51) Int. Cl.
*C01B 3/38* (2006.01)
*C01B 3/32* (2006.01)
*C01B 3/50* (2006.01)

(52) U.S. Cl.
CPC ............... *C01B 3/38* (2013.01); *C01B 3/323* (2013.01); *C01B 3/501* (2013.01);
(Continued)

(58) Field of Classification Search
CPC ........................................................ C01B 3/38
See application file for complete search history.

(56) References Cited

U.S. PATENT DOCUMENTS 6,090,312 A    7/2000  Ziaka et al.
6,268,075 B1   7/2001  Autenrieth et al.
(Continued)

FOREIGN PATENT DOCUMENTS

DE         20121990 U1   10/2003
DE      202010012734 U1   12/2011
(Continued)

OTHER PUBLICATIONS

A. Basile & F. Gallucci (ed.): Membranes for membrane reactors: preparation, optimization and selection. 2011. 1-61.
(Continued)

*Primary Examiner* — Douglas B Call
(74) *Attorney, Agent, or Firm* — Smartpat PLC

(57) ABSTRACT

The invention relates to an installation (1) and a method allowing the near total recovery and space-saving storage of carbon in the form of liquid carbon dioxide (19), from a substance (9) of the group consisting of hydrocarbons/ethers/alcohols, without the use of gas compression. To achieve this, a superheated gas (12) at a pressure of over 5.18 bar is generated from the substance (9) of the group consisting of hydrocarbons/ethers/alcohols and water (10), and this gas is delivered, by means of steam reforming and hydrogen liberation, into a retentate mass flow (15) containing carbon dioxide. Liquid carbon dioxide (19) is obtained therefrom by means of condensation, and is stored in a storage tank (7) while the liberated hydrogen is oxidised to provide mechanical and/or electrical as well as thermal energy. The use of membranes with low hydrogen/carbon dioxide permeation selectivity is permitted by forming a permeate mass flow circuit that is closed in respect of carbon dioxide. Operation at low pressures is permitted by the condensation and storage at temperatures below the ambient
(Continued)

temperature, for which purpose cold (17) is generated from said thermal energy in a sorption method.

13 Claims, 3 Drawing Sheets

(52) U.S. Cl.
CPC .. *C01B 2203/0233* (2013.01); *C01B 2203/04* (2013.01); *C01B 2203/041* (2013.01); *C01B 2203/046* (2013.01); *C01B 2203/0475* (2013.01); *C01B 2203/0495* (2013.01); *C01B 2203/066* (2013.01); *C01B 2203/1211* (2013.01); *C01B 2203/1217* (2013.01); *C01B 2203/1235* (2013.01); *C01B 2203/1294* (2013.01); *C01B 2203/84* (2013.01); *Y02P 20/133* (2015.11); *Y02P 30/00* (2015.11)

(56) References Cited

U.S. PATENT DOCUMENTS

| | | | |
|---|---|---|---|
| 7,332,146 B1* | 2/2008 | Huang | C01B 3/506 423/437.1 |
| 2004/0237406 A1 | 12/2004 | Fuder | |
| 2005/0123810 A1 | 6/2005 | Balan | |
| 2007/0017369 A1* | 1/2007 | LeVan | H01M 8/04089 95/96 |
| 2008/0271466 A1* | 11/2008 | Giacobbe | F25J 3/08 62/46.1 |
| 2009/0117024 A1 | 5/2009 | Weedon et al. | |
| 2009/0155650 A1* | 6/2009 | Cui | H01M 8/0618 429/420 |
| 2010/0260657 A1* | 10/2010 | Niitsuma | C01B 3/382 423/437.1 |
| 2012/0121497 A1* | 5/2012 | Terrien | F25J 3/0252 423/437.1 |
| 2012/0174621 A1* | 7/2012 | Raja | F25J 1/0234 62/606 |
| 2012/0258037 A1* | 10/2012 | Pham | B01J 23/755 423/652 |
| 2014/0196481 A1* | 7/2014 | Dube | B01D 53/1475 62/79 |
| 2014/0264176 A1* | 9/2014 | Wynn | C01B 3/501 252/373 |
| 2015/0089919 A1 | 4/2015 | Kuehn | |
| 2016/0123672 A1* | 5/2016 | Pingale | F28B 9/08 137/177 |
| 2018/0079643 A1* | 3/2018 | Mortensen | C01B 3/38 |

FOREIGN PATENT DOCUMENTS

| | | |
|---|---|---|
| DE | 102012103458 A1 | 10/2013 |
| EP | 0539244 B1 | 3/1996 |
| EP | 0924163 A3 | 10/1999 |
| EP | 2023066 A1 | 2/2009 |
| EP | 2181962 A1 | 5/2010 |
| EP | 1858803 B1 | 7/2016 |
| GB | 1104971 A | 3/1968 |
| JP | 2010235358 A | 10/2010 |
| JP | 2011020863 A | 2/2011 |
| WO | 0214215 A2 | 2/2002 |
| WO | WO 2014199396 | * 12/2014 |

OTHER PUBLICATIONS

Gallucci, F., Basile, A .: Co-current and Counter-current modes for methanol steam reforming membrane reactor. International Journal of Hydrogen Energy 32 (2006) 2243-2249.

* cited by examiner

US 10,981,785 B2

INSTALLATION AND METHOD FOR CARBON RECOVERY AND STORAGE, WITHOUT THE USE OF GAS COMPRESSION

TECHNICAL FIELD

The disclosure relates to an installation and a method for recovering and storing carbon in form of carbon dioxide in energy storage systems that are based on the following carbon cycle: When energy is stored, carbon-containing compounds (such as hydrocarbons, alcohols or ethers) are generated from carbon dioxide. When energy is released the resulting carbon dioxide is separated and stored for reuse during further synthesis of carbon-containing compounds.

BACKGROUND

The increasing development of intermittent, renewable production installations for electrical energy (especially photovoltaic and wind power installations) requires an increasing storage of the energy generated in order, on the one hand, to be able to use the surplus electricity that cannot be fed into the grid and, on the other hand, to adapt the energy production to the energy demand curve.

There are a variety of electrical, mechanical and electrochemical storage systems available (capacitors, flywheels, batteries, compressed air storage) for short-term storage (a few hours) of energy having low to medium capacity. For medium- and long-term storage (days to months) of electrical energy having large capacity, only storage systems that save the electrical energy in the form of chemical energy sources ("power-to-chemicals") can be used besides pumped storage hydro power stations for technical and economic reasons. In this case, besides methods which generate and store hydrogen gas, there are also prior art methods which synthesize and store carbon-containing compounds as energy storage media using carbon dioxide. Such carbon-based energy storage systems are advantageous with respect to hydrogen gas. Among other things, such energy storage systems have the advantage that they also synthesize chemical compounds for energy storage, which are present in liquid form at ambient temperature ("power-to-liquid") and thus can be easily transported and stored in a space-saving manner.

In such carbon-based energy storage systems for storing electrical energy, the feeding of electrical energy occurs by the conversion of carbon dioxide into carbon-containing chemical compounds (e.g., methane, methanol) by means of hydrogen obtained from water and the storage of these carbon-containing compounds (in tank vessels or underground storage), while the output of energy is based on the oxidation of the carbon contained in the carbon-containing compound, that is, on the recovery of carbon contained in the carbon-containing compound in the form of carbon dioxide, and based on the storage of this carbon dioxide. Thus, such carbon-based energy storage systems establish a system internal carbon cycle, for the maintenance of which the fullest possible recovery of the carbon contained in the carbon-containing compounds is necessary. Such carbon-based energy storage systems therefore contain an installation for the output of energy, which installation recovers and stores the carbon contained in the carbon-containing compounds in the form of carbon dioxide as completely as possible, and which thereby releases mechanical or electrical energy through the oxidation of carbon and hydrogen.

Such carbon-based energy storage systems are described in the following documents:

EP 0539244 describes several methods of energy storage that synthesize methanol from carbon dioxide for the feeding of energy and recover this carbon dioxide with the output of energy.

DE 202010012734 and DE 102012103458 also describe energy storage systems which burn hydrocarbons or alcohols to obtain energy, which separate resulting carbon dioxide and use this separated carbon dioxide again for the production of hydrocarbons or alcohols.

Generally, such energy storage systems having a carbon cycle have a low energy efficiency (defined as the ratio of the electrical energy supplied to the empty energy storage system to the electrical or mechanical energy that can be taken from the energy storage system when completely emptied), since, first, the installations used for the storage of electrical energy for synthesizing the carbon-containing compound according to the current state of the art have low (<70%) energy efficiencies (defined as the ratio of the lower or higher heating value of the synthesized compounds to the amount of electrical energy which is supplied to the synthesis) and second, the installations used for the output of electrical energy for the recovery and storage of carbon dioxide with simultaneous release of mechanical or electrical energy also have a low energy efficiency (defined as the ratio of the amount of released mechanical or electrical energy to the lower or higher heating value of the supplied carbon-containing compounds). The low efficiency of the latter installations is due not only to the low energy efficiency of the heat engines or fuel cells used in these installations, but also that the method steps performed in these installations for the separation and storage of carbon dioxide take up considerable amounts of energy fed into the energy storage system and deliver only poorly usable waste heat, often generated by the compression of gases. This compression of gases is usually performed within the installations for the recovery and storage of carbon dioxide in order to bring the carbon dioxide into a sufficiently dense state for its storage, thus avoiding excessive space requirements for its storage. Therefore, it would be desirable to have an installation and a method which would enable the recovery and storage of carbon in the form of carbon dioxide and the resulting release of electrical or mechanical energy within such an energy storage system as energy-efficiently as possible and which in particular contain no installation parts or method steps which provide for the compression of gases. The recovery of carbon in this case should still be performed as completely as possible and with a sufficient storage density.

The installations and methods mentioned in EP 0539244, DE 202010012734 and DE 102012103458 do not contain any detailed method steps on how to perform the recovery and storage of carbon in the form of carbon dioxide within the energy storage system.

JP 2011020863 provides a method that increases energy efficiency which, when energy is output from the energy storage system, the energy-storing, carbon-containing compound is reformed by means of the waste heat that is released by the oxidation of the hydrogen which is separated from the product gas generated during the reforming (see description paragraph 24 and FIG. 1). However, JP 2011020863 does not contain any information as to how the carbon dioxide separated by a membrane method is stored energy-efficiently within the storage system and also provides energy-consuming separation of the hydrogen from the product gas of the reforming performed by pressure swing adsorption, which is performed before the carbon dioxide separation due to the limited carbon dioxide/hydrogen permeation selectivity of said membrane.

Numerous other industrial methods are known which serve to separate carbon dioxide from carbon dioxide-containing gases. However, these usually target the conditioning of the separated carbon dioxide for transport by means of pipeline and for underground sequestration and therefore bring the separated carbon dioxide not in a liquid state, but in a highly compressed, gaseous or supercritical state for the purpose of density increase. These methods usually perform a compression of the separated carbon dioxide. EP 2023066 describes, for example, a method for separating the carbon dioxide from a carbon dioxide-containing synthesis gas and thereby repetitively evaporates the condensed, liquid carbon dioxide to cool inflowing carbon dioxide, to finally compress all the carbon dioxide gas produced in the method to a supercritical pressure (>73.8 bar).

In principle, by methods which provide a compression of carbon dioxide at temperatures below the inversion temperature of carbon dioxide (about 1500° K at atmospheric pressure), due to the resulting warming of carbon dioxide waste heat is generated, which can be converted into electrical or mechanical energy with poor efficiency, the energy efficiency of an energy storage system having a carbon cycle is thus reduced. Since, during the process of the energy output from such an energy storage system, large amounts of waste heat which can be converted only which poor efficiency into electrical or mechanical energy are already generated by the heat engines or fuel cells operated during this output, the waste heat generated by the compression of carbon dioxide or other gases increases even further the total amount of waste heat that is hardly usable within the energy storage system.

To increase the energy efficiency of energy storage systems having a carbon cycle, a desirable installation and a method would be those that fully recover the carbon contained in the carbon-containing compounds in the form of carbon dioxide in such energy storage systems and store it with high density without containing method steps which provide for the mechanical compression of gases, in particular of carbon dioxide or of carbon dioxide-containing gases.

In U.S. Pat. No. 6,090,312, a carbon dioxide/hydrogen mixture is separated from a product gas of a steam reforming by means of a membrane, which is also provided, among other things, for further chemical processing and as a fuel (Claim 1). For obtaining pure hydrogen gas, there is also proposed a condensation of the carbon dioxide from this carbon dioxide/hydrogen mixture. In addition, U.S. Pat. No. 6,090,312 describes a partial return of the residual gas remaining in the reformer after separation through the membrane.

SUMMARY

An object of the present disclosure is to provide, within an energy storage system having a carbon cycle, an installation and a method, to separate, as completely as possible, the carbon contained in a high-energy, carbon-containing compound (hydrocarbon, alcohol, ether) from said compound in the form of carbon dioxide and to store it at high density without performing compression of gases, in particular carbon dioxide, or carbon dioxide-containing gases.

The object is achieved by an installation for the recovery and storage of carbon in the form of liquid carbon dioxide from substances of the group hydrocarbons/ethers/alcohols. The installation includes a steam generator for evaporating water and a substance of the group hydrocarbons/ethers/alcohols. It also includes a membrane reactor for catalytic steam reforming the substance of the group hydrocarbons/ethers/alcohols and for separating hydrogen gas from a product gas generated by the steam reforming. It further includes a device for condensing carbon dioxide from a gas mixture containing carbon dioxide and a storage tank for carbon dioxide. The installation also includes a device for oxidizing hydrogen gas, selected from the group of internal combustion engines or from the group of fuel cell systems. A line for transporting gas at more than 5.18 bar pressure connects the steam generator, the membrane reactor, and the device for condensing carbon dioxide. A line for transporting a liquid medium at above 5.18 bar pressure connects the device for condensing carbon dioxide and the storage tank for carbon dioxide. A line which connects the membrane reactor and the device for oxidizing hydrogen gas is usable to supply a hydrogen-containing gas to the device for oxidizing hydrogen gas.

In the installation the steam generator is configured to generate steam having a pressure above 5.18 bar. The membrane reactor, the device for condensing carbon dioxide, and the storage tank for carbon dioxide are operable at gas pressures of over 5.18 bar. The steam generator has an inlet device for supplying heat and contains a recuperator. The device for oxidizing hydrogen gas is operable at a temperature which is above an operating temperature of the steam generator, and the device for oxidizing hydrogen gas is operable at a temperature which is above the operating temperature of the steam generator. The device for condensing carbon dioxide comprises a recuperator.

The term "compression" is understood in this patent specification, equivalent to the use of the term in physical and technical sciences, to mean an all-round compression of a body that reduces its volume, increases its density and thereby causes no change in its state of aggregation.

The term "gas compression" is understood in this patent specification to mean the compression of gases. If a gas is compressed below its inversion temperature, heat is thereby released. For example, since carbon dioxide has an inversion temperature of about 1500° K at atmospheric pressure, the compression of carbon dioxide in industrial methods usually leads to the release of heat. Likewise, the compression of water vapor-containing, hydrocarbon-containing, alcohol-containing or ether-containing gases at temperatures which usually occur in industrial methods also leads to the release of heat.

The term "ambient temperature" is understood in this patent specification to mean the temperature of the medium surrounding the installation (e.g., air).

In this patent specification, the term "catalytic steam reforming" is understood to mean that chemical equilibrium reaction in which hydrocarbons, alcohols or ethers are converted into a gas mixture with the addition of water at a corresponding temperature and in the presence of suitable catalysts, which gas mixture, in addition to hydrogen gas, also contains various amounts of carbon monoxide and carbon dioxide. Corresponding catalysts are well known for a wide variety of hydrocarbons, alcohols and ethers. For example, copper-based catalysts such as $Cu/ZnO/Al_2O_3$ can be used for a steam reforming of methanol.

Carbon monoxide and carbon dioxide are also in a chemical equilibrium relationship with one another in the process of steam reforming (water-gas shift reaction). In addition, further equilibrium reactions may occur in the process of steam reforming, depending on the starting materials used. In the case of methanol, the steam reforming and the chemical methods taking place parallel to it can be summarized by the following reaction equations:

| | | |
|---|---|---|
| (1) | $CH_3OH + H_2O \Leftrightarrow CO_2 + 3H_2$ | $\Delta H°_{298\ K} = +49.51$ kJ/mol |
| (2) | $CO + H_2O \Leftrightarrow CO2 + H_2$<br>Water gas shift reaction | $\Delta H°_{298\ K} = -41.19$ kJ/mol |
| (3) | $CH_3OH \Leftrightarrow CO + 2H_2$<br>Methanol decomposition | $\Delta H°_{298\ K} = +90.70$ kJ/mol |

Since steam reforming is usually performed with a super-stoichiometric excess of water, the product gas generated thereby usually also contains water vapor.

The term "permeate side" of a hydrogen-separating membrane is understood in this patent specification to mean that side of the membrane at which the hydrogen separated from the membrane emerges from the membrane.

The term "permeate mass flow" is understood in this patent specification to mean the mass flow which flows around a hydrogen-separating membrane on the permeate side.

The term "retentate side" of a hydrogen-separating membrane is understood in this patent specification to mean that side of the membrane at which the hydrogen enters the membrane.

The term "retentate mass flow" is understood in this patent specification to mean that mass flow which flows around a hydrogen-separating membrane on the retentate side. In the case of a membrane reactor in which a catalytic steam reforming of a substance of the group hydrocarbons/ethers/alcohols and a separation of hydrogen gas is performed, this retentate mass flow contains carbon dioxide and may also contain water with superstoichiometric admixture of water to perform the steam reforming.

The term "carbon dioxide-closed permeate mass flow circuit" is understood in this patent specification to mean a permeate mass flow conducted in a circuit (e.g., via the anode region of a fuel cell or a recuperator) which contains a constant amount of carbon dioxide. Other substances, such as water, can be introduced into or removed from this circuit.

The term "condensation" of a substance from a gas mixture is understood in this patent specification to mean the cooling of the gas mixture below the temperature at which the saturation vapor pressure of the condensed substance falls below the partial pressure of this substance in the gas mixture and therefore forms a liquid phase which contains the condensed substance. In addition, the term "condensation" in this patent specification also means the separation of this liquid phase from the remaining gaseous phase, which can be performed by a corresponding device such as a steam trap.

BRIEF DESCRIPTION OF THE DRAWINGS

Three variants of an installation an installation and a method for recovering and storing carbon in form of carbon dioxide are shown schematically in FIGS. 1 to 3.

DETAILED DESCRIPTION

Figure 1:
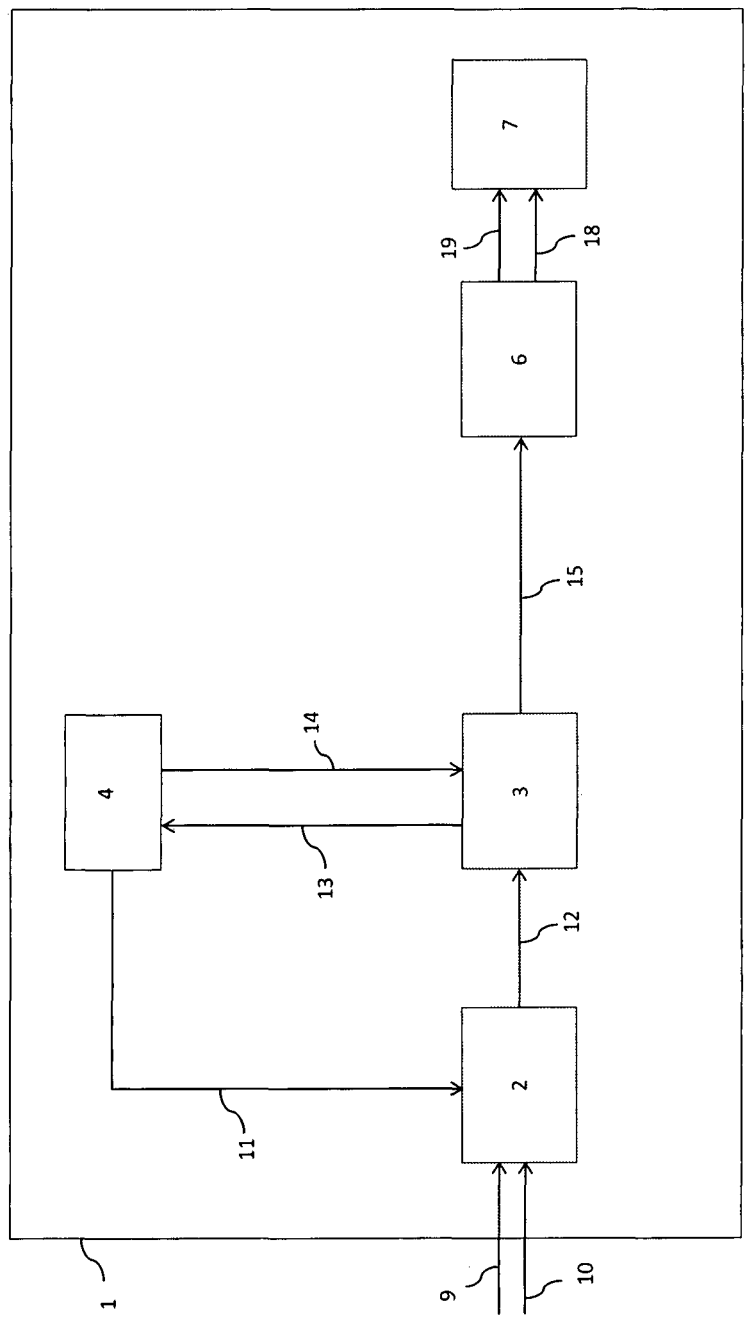
FIG. 1 shows an installation having a solid oxide fuel cell as a device (4) for oxidizing hydrogen gas and having two lines between this solid oxide fuel cell and the membrane reactor (3): a first line for supplying the hydrogen-containing permeate mass flow (13) emerging from the membrane reactor (3) in the anode region of the solid oxide fuel cell and a second line for supplying the oxidized permeate mass flow (14) from the anode region of the solid oxide fuel cell in the membrane reactor (3).

Referring to FIG. 1, an installation (1) for gas compression-free recovery and storage of carbon in the form of liquid carbon dioxide (19) from substances (9) of the group hydrocarbons/ethers/alcohols includes the following devices:
   at least one steam generator (2) for evaporating water and a substance of the group hydrocarbons/ethers/alcohols;
   at least one membrane reactor (3) for the catalytic steam reforming of a substance of the group hydrocarbons/ethers/alcohols and for the separation of hydrogen gas from the product gas generated by the steam reforming;
   at least one device (6) for condensing carbon dioxide from a gas mixture containing carbon dioxide;
   at least one storage tank (7) for carbon dioxide; and
   at least one device (4) for oxidizing hydrogen gas, selected from the group of internal combustion engines or from the group of fuel cell systems.

The installation has the following characteristics:
The steam generator (2) is designed to generate steam greater than 5.18 bar and the membrane reactor (3), the device for condensing carbon dioxide (6) and the storage tank for carbon dioxide (7) are operable at gas pressures greater than 5.18 bar.
The steam generator (2) for evaporating water and a substance of the group hydrocarbons/ethers/alcohols has an inlet device for the supply of heat (11) and contains at least one recuperator.
The device (4) for oxidizing hydrogen gas is operable at a temperature which is above the operating temperature of the steam generator (2).

The following lines exist between said devices:
At least one line for transporting gas at more than 5.18 bar pressure, which line connects the steam generator (2), the membrane reactor (3), and the device (6) for condensing carbon dioxide;
at least one line for transporting a liquid medium at above 5.18 bar pressure, which line connects the device (6) for condensing carbon dioxide and the storage tank (7) for carbon dioxide; and
at least one line for transporting a hydrogen-containing gas which connects the membrane reactor (3) and the device (4) for oxidizing hydrogen gas and which is usable for supplying a hydrogen-containing gas to the device (4) for oxidizing hydrogen gas (4).

The device (4) for oxidizing hydrogen gas (heat engine or fuel cell) contained in the installation (1) produces large amounts of waste heat in the current state of the art due to its low energy efficiency. In order to utilize this waste heat for performing the evaporation, in the installation (1), the steam generator (2) for evaporating water and a substance of the group hydrocarbons/ethers/alcohols has an inlet device for the supply of heat (11) and contains a recuperator (e.g., plate heat exchanger, spiral heat exchanger, tube bundle heat exchanger). The steam generator (2) for evaporating water and a substance of the group hydrocarbons/ethers/alcohols is also designed in the installation (1) so that it generates a gas of over 5.18 bar, since this is the smallest thermodynamically possible pressure for condensing carbon dioxide downstream the steam generator (2) and the installation (1) does not contain a gas compressor, which could serve to further increase pressure within the installation. The steam generator (2) is also designed so that it generates a superheated gas at a temperature which is not below the operating temperature of the membrane reactor (3). When using methanol as a carbon-containing compound for energy storage, this temperature is about 250-300° C. Steam generators which contain a recuperator and which generate a gas of more than 5.18 bar (up to more than 200 bar) and up to 500-600° C. are state of the art. They are advantageously built in three stages (with preheater, evaporator and superheater). In particular, steam generators for water and for methanol, which generate gases of 300° C., are state of the art.

Membrane reactors for the catalytic steam reforming of a substance of the group hydrocarbons/ethers/alcohols and for separating hydrogen gas from the product gas generated by this steam reforming are also state of the art. Various embodiments of such membrane reformers for steam reforming are described in the literature (see., for example: Gallucci, F., Basile, A. & Hai, F. Ibney: Introduction—A review of membrane reactors. In: A. Basile & F. Gallucci (ed.): Membranes for membrane reactors: preparation, optimization and selection. 2011. 1-61). Membrane reactors having metal membranes (e.g., palladium alloys), ceramic membranes, carbon membranes or zeolite membranes are used at temperatures above 250° C. These are heat-stable at temperatures up to 800° C. and also have sufficient pressure stability up to 60 bar and more when using a corresponding support structure. However, the different types of membrane sometimes differ considerably in their permeation selectivity: While certain metal membranes (e.g., palladium membranes) allow a pure separation of hydrogen from hydrogen-containing gases, zeolite or carbon membranes, for example, achieve significantly lower permeation selectivities of hydrogen with respect to other gases such as carbon dioxide or gaseous water. Since the installation is intended to recover as completely as possible the carbon from the substance (9) of the group hydrocarbons/ethers/alcohols used in the energy storage system, any permeation of carbon dioxide into the permeate mass flow of the membrane reactor is detrimental when this permeate mass flow in the downstream device (4) for oxidizing hydrogen gas (heat engine or fuel cell) is oxidized with air and the resulting exhaust gas flow is released into the atmosphere. With limited hydrogen/carbon dioxide permeation selectivity of the membrane, this results in an incomplete recovery of carbon within the energy storage system, which leads to a cessation of this carbon cycle within the energy storage system and thus to a malfunction of the energy storage system with non-supply of additional carbon within the energy storage system. An advantageous variant of the installation (1), which allows the use of membranes with low hydrogen/carbon dioxide permeation selectivity, without causing the problem of incomplete recovery of carbon, will be described further below.

In the device (6) for condensing carbon dioxide from a carbon dioxide-containing gas mixture, various types of recuperators (e.g., plate heat exchangers, spiral heat exchangers, tube bundle heat exchangers) may be used, as are known in the art and can easily be designed for an operating pressure above 5.18 bar.

The storage tank (7) for carbon dioxide is to be designed so that it stores the carbon dioxide condensed in the installation without pressure loss. In addition to carbon dioxide, this condensate may also contain various amounts of water, and residues of the substance (9) of the group hydrocarbons/ethers/alcohols which were not converted in the membrane reactor. If the installation is operated at a low pressure (from 5.18 bar to about 20 bar) and therefore the condensation of carbon dioxide and the storage of this condensate takes place at this low pressure, then the operating conditions of the storage tank (7) for carbon dioxide are similar to those of tanks for storing LPG (liquified petroleum gas). Design concepts and many years of experience in LPG storage systems can be used in their engineering. Storage tanks up to pressures of 700 bar are state of the art and are used, for example, for the high-pressure storage of hydrogen.

The device (4) for oxidizing hydrogen gas, which is connected by means of a pipeline to the membrane reactor and which oxidizes the hydrogen-containing permeate mass flow (13) generated in the membrane reactor, can be designed as a heat engine (internal combustion engine, gas turbine) or as a fuel cell. This device has an operating temperature which is above the operating temperature of the membrane reactor (3). Since the steam reforming of substances from the group hydrocarbons/ethers/alcohols in the membrane reactor (3) is usually performed at temperatures above 250° C., fuel cells which have a corresponding operating temperature (e.g., solid oxide fuel cells) are mainly considered. Due to the operating temperature of the device (4) for oxidizing hydrogen gas being above the operating temperature of the membrane reactor (3), the waste heat generated by this installation (4) can be supplied to the recuperator contained in the steam generator (2) and thus the process of evaporation taking place there can be supplied with process heat.

All mentioned components of an installation for performing the method have to be matched as part of engineering routine work in their design, in particular in their capacity, and provided with a common control system.

To solve the above-mentioned problem of using membranes with limited hydrogen/carbon dioxide permeation selectivity, in a variant of an installation, the device (4) for oxidizing hydrogen gas consists of a solid oxide fuel cell and also contains, in addition to the above-mentioned line for transporting the hydrogen-containing permeate mass flow (13) from the membrane reactor into the solid oxide fuel cell, a further line which connects said solid oxide fuel cell to the membrane reactor (3) and which serves to return the permeate mass flow (14) oxidized in the anode region of the solid oxide fuel cell to the permeate side of the membrane of the membrane reactor (3). By using a solid oxide fuel cell as a device (4) for oxidizing hydrogen gas and the said return of the oxidized permeate mass flow (14) in the membrane reactor (3), carbon dioxide, which, due to the limited hydrogen/carbon dioxide permeation selectivity of the membrane, passes through the membrane of the reactor into the hydrogen-containing permeate mass flow (13), is not released into the atmosphere.

Figure 2:
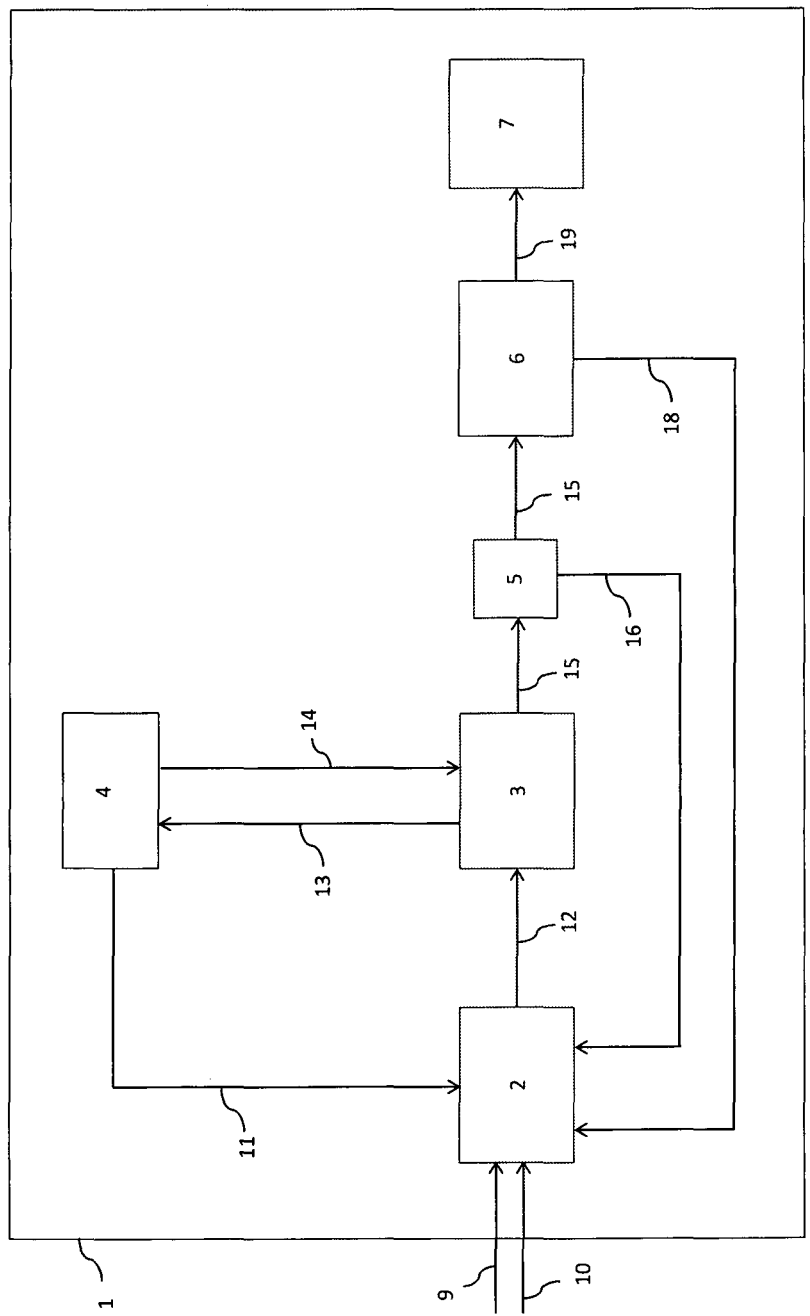
FIG. 2 shows a variant embodiment as in FIG. 1, but having a device (5) for condensing water and having a line for returning water (16) and a line for returning the residual gas (18) into the steam generator (2).

A further variant of an installation as shown in FIG. 2 contains a device (5) for condensing water which is intermediary between the membrane reactor (3) and the device (6) for condensing carbon dioxide from a gas mixture containing carbon dioxide. In addition, this variant of an installation includes a line for transporting water, which connects said device (5) for condensing water and the steam generator (2) for evaporating water and a substance of the group hydrocarbons/ethers/alcohols. This device (5) can reduce the amount of water that is in the retentate mass flow of the membrane reactor after the steam reforming of the methanol, thereby increasing the concentration of carbon dioxide in the retentate mass flow and the space efficiency (defined as the ratio of the volume claimed by the liquid carbon dioxide in the storage space to the volume of the entire storage space) can be increased when storing the liquid carbon dioxide (19) in the storage tank (7).

A further variant of an installation comprises a line for gas transport, which connects the device (6) for condensing carbon dioxide from a gas mixture containing carbon dioxide to the steam generator (2) or to the membrane reactor (3). This line allows the residual gas (18) formed during the condensation of carbon dioxide to not be supplied to the storage tank (7) for carbon dioxide and thus to use the storage space in the storage tank (7) efficiently for the storage of liquid carbon dioxide (19).

Figure 3:
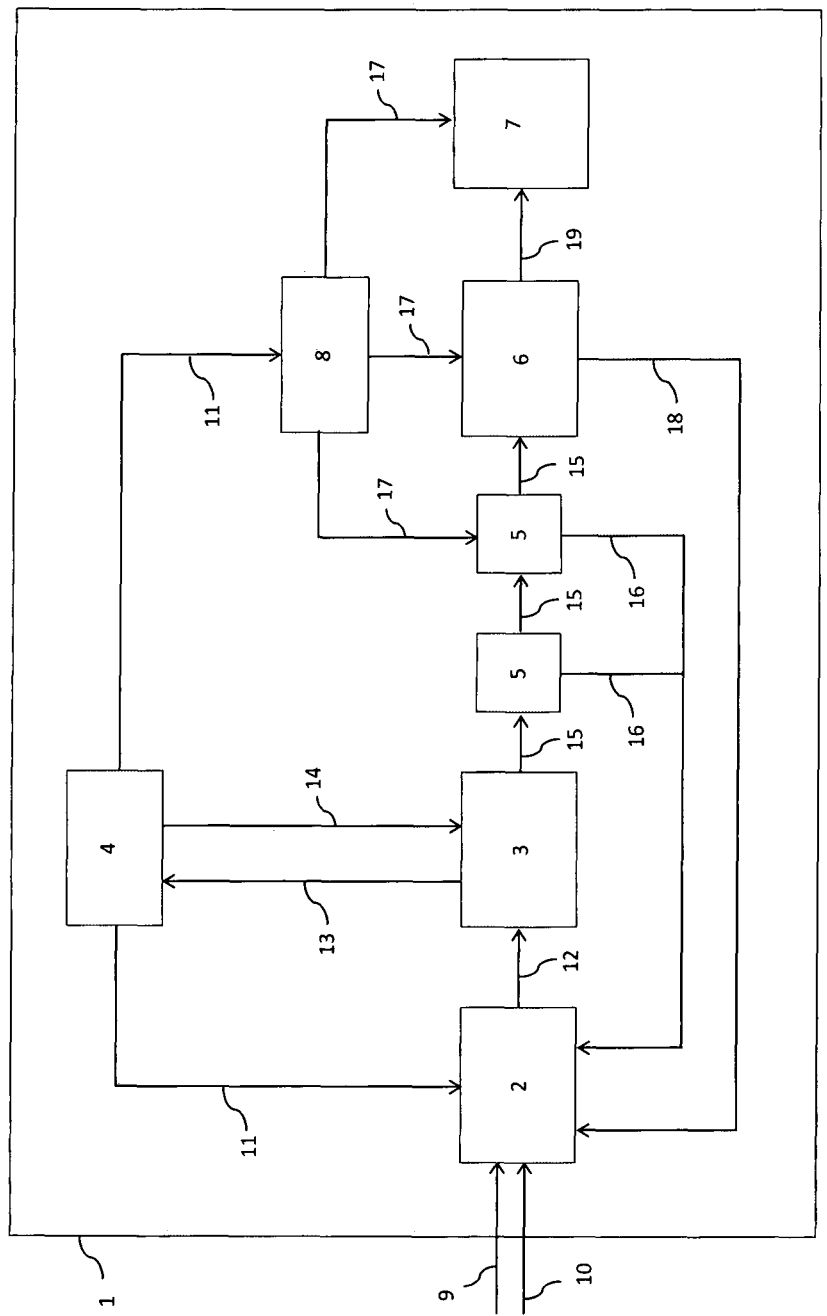
FIG. 3 shows a variant embodiment as shown in FIG. 2, but having two devices (5) for condensation of water and an absorption chiller for generating refrigeration (17) from heat (11) of the device (4) for oxidizing hydrogen gas. The refrigeration (17) generated in the absorption chiller is supplied to a device (5) for condensing water, the device (6) for condensing carbon dioxide and the storage tank (7) for carbon dioxide and allows a performing of the respective method steps below the ambient temperature in these installation parts.

In order to be able to bring about a condensation of carbon dioxide at low operating pressures of less than about 70 bar, temperatures below frequently occurring ambient temperatures (about +25°) are necessary. For energy-efficient generation of this refrigeration necessary for the condensation and storage of carbon dioxide, a further variant of an installation as shown in FIG. 3 contains an absorption chiller (8), a storage tank (7) for carbon dioxide which contains a device for cooling the tank contents to a temperature level below the ambient temperature, a line for transporting a refrigerating medium below the ambient temperature, which connects the absorption chiller (8) and the device (6) for condensing carbon dioxide and a line for transporting a refrigerating medium below the ambient temperature, which connects the absorption chiller (8) and the storage tank (7) for carbon dioxide. As a result, refrigeration (17) can be generated in the absorption chiller (8) by means of heat (11) from the device (4) for oxidizing hydrogen gas (heat engine or fuel cell), which can be used for condensing the carbon dioxide from the retentate mass flow (15) below the ambient temperature and for cooling the storage tank (7) for carbon dioxide. For example, a one- or two-stage ammonia absorption refrigeration system can be used. It is state-of-the-art in various performance classes and can reach temperatures below −50° C., and thus enable the condensation of carbon dioxide even at a low pressure of less than 6 bar. The lines for the transport of a refrigerant medium may consist of closed pipe circuits and, for example, ammonia can be used as a refrigerant medium. For the device for cooling the tank contents to a temperature level below the ambient temperature, in turn, various types of recuperators can be used, as known in the prior art (e.g., plate heat exchanger, spiral heat exchanger, tube bundle heat exchanger).

A further variant of an installation contains two devices (5) for condensing water from a water vapor-containing gas mixture, of which one of these devices is connected to the absorption chiller (8) by means of a line for transporting a refrigerant medium below the ambient temperature.

The core of the invention described in this patent specification is a method for the gas compression-free and complete recovery of carbon in the form of liquid carbon dioxide from high-energy, carbon-containing compounds (hydrocarbon, alcohol, ether) and its high-density storage, characterized by the following steps:

Step 1: Generation of a superheated gas (12) having more than 5.18 bar pressure by evaporation and heating of water (10) and of a substance (9) of the group hydrocarbons/ethers/alcohols in a steam generator (2) to which heat (11) is supplied;

Step 2: Catalytic steam reforming of the overheated gas (12) generated in step 1 above 5.18 bar pressure and generation of a retentate mass flow (15) by separating hydrogen gas from the product gas generated by the steam reforming by means of a membrane method;

Step 3: Generating a residual gas (18) by condensing liquid carbon dioxide (19) from the retentate mass flow (15) generated in step 2;

Step 4: Storing the liquid carbon dioxide (19) condensed in step 3 in a storage tank (7) for carbon dioxide;

Step 5: Release of heat (11) with temperatures that are higher than the temperature of the catalytic steam reforming in step 2 and of electrical and/or mechanical energy by oxidation of the hydrogen gas generated and separated in step 2.

In order for the gas generated in the steam generator (2) to contain sufficient thermal energy for the steam reforming provided in step 2, an overheated gas (12) is produced in a method in step 1.

Gas having more than 5.18 bar pressure must be generated in the steam generator (2) since this gas, after it has passed through the membrane reactor (3), must still have a pressure of over 5.18 bar in the device (6) for condensing carbon dioxide to be able to be liquefied by cooling. However, the gas pressure actually required in the device (6) for condensing carbon dioxide depends on the composition of the retentate mass flow (15): If the hydrogen separation in step 2 is incomplete and the retentate mass flow (15) therefore contains increased amounts of hydrogen, the pressure required for carbon dioxide condensation increases, since the partial pressure of the carbon dioxide in the retentate mass flow (15) must be at least 5.18 bar. Accordingly, in this case, an overheated gas (12) having a higher pressure must also be generated in the steam generator (2).

Since heat (11) having a temperature above the temperature of the catalytic steam reforming in step 2 is released in a method in step 5, this heat (11) can be supplied to the recuperator of the steam generator (2) in step 1 in order to operate the evaporation and overheating process taking place there. This supply of heat (11) from step 5 can be done by the direct supply of the exhaust gas arising during the oxidation in the recuperator or by means of an intermediary heat transfer medium (e.g., oil), which is heated by an additional heat exchanger from said exhaust gas.

Due to the performance of the steam reforming in a membrane reactor with hydrogen permeable membrane, the thermodynamic equilibrium of the steam reforming shifts in favor of hydrogen and carbon dioxide, so that in a membrane reactor, an almost complete decomposition of the supplied substance (9) from the group hydrocarbons/ethers/alcohols to hydrogen gas and carbon dioxide can be achieved. Depending on the size and nature of the membrane surface, the partial pressure of the hydrogen in the product gas generated by the steam reforming and the mode of operation of the membrane reactor (counter-current method or co-current flow method), a differently sized separation efficiency of hydrogen (defined as the ratio of the amount of hydrogen generated in the membrane reactor to the amount of hydrogen separated by the membrane) is achieved in step 2. This can also be nearly 100% with the corresponding partial pressure of the hydrogen and the corresponding size and nature of the membrane (see Gallucci, F., Basile, A.:

Co-current and Counter-current modes for methanol steam reforming membrane reactor. International Journal of Hydrogen Energy 32 (2006) 2243-2249.

The condensation of liquid carbon dioxide (19) in step 3 from the retentate mass flow (15) generated in step 2 can in turn be effected by recuperators. The condensation of carbon dioxide is performed according to the condensation curve of carbon dioxide at temperatures and partial pressures of about 31° C./74 bar to about −56.6° C./5.185 bar. The partial pressure of carbon dioxide in the retentate mass flow (15) must therefore be above 5.18 bar to allow condensation of the carbon dioxide and established in step 1 of the method.

The liquid carbon dioxide (19) condensed in step 3 is stored in liquid form in a storage tank (7) for carbon dioxide. This storage tank must therefore also be operated with an internal pressure of at least 5.18 bar.

The oxidation performed in step 5 of the hydrogen gas generated and separated in step 2 to release electrical and/or mechanical and thermal energy can be performed in a fuel cell or a heat engine. The temperature level of the heat (11) released in step 5 is high enough both when using internal combustion engines and when using certain fuel cells (in particular solid oxide fuel cells), in order to operate the steam reforming of certain alcohols and ethers (in particular methanol) without further heat source (for example, also without an autothermal reforming by partial oxidation of the alcohols). Thus, exhaust gases from internal combustion engines have temperatures up to 450° C., while the steam reforming of methanol at temperatures of about 250-350° can be performed. Solid oxide fuel cells operate at temperatures above 650° C.

An energy balance analysis also shows that the amount of heat (11) released in step 5 for the heat supply of the steam generator (2) in step 1 is sufficient. This applies in particular to energy systems that use methanol as a carbon-containing energy source:

For example, an amount of heat of about 105 kJ is required for the evaporation and superheating of 1 mol of water and 1 mol of methanol (from 20° C. to 280° C.). The steam reforming of 1 mol of methanol and 1 mol of water to 1 mol of carbon dioxide and 3 mol of hydrogen gas provided in step 2 has a heat requirement of 50 $kJ/mol_{[methanol+water]}$ under standard conditions according to the equations given above. The amount of heat to be supplied in step 1 is thus about 155 kJ in total for the conversion of 1 mol of methanol and 1 mol of water (both at 20° C.) to 1 mol of carbon dioxide and 3 mol of hydrogen gas (both at 280° C.). In comparison, the amount of energy released by oxidation of 3 mol of hydrogen gas to water is about 1272 kJ (or 1455 kJ when water condenses). Even if only 35% of this amount of energy can be tapped as heat and fed to the recuperator of the steam generator, which corresponds to about 445 kJ (or 494.7 kJ), this amount of heat still exceeds the amount of heat required for evaporation and overheating by a multiple.

While, as noted above, certain metal membranes (e.g., palladium membranes) permit pure separation of hydrogen from hydrogen-containing gases, other membranes, such as zeolite or carbon membranes, achieve significantly lower permeation selectivities of hydrogen with respect to gases such as carbon dioxide or gaseous water. For molecular sieve membranes such as zeolite or carbon membranes, the hydrogen permeation selectivity with respect to both carbon dioxide and water is relatively low. In order to achieve the most complete recovery of carbon in the form of carbon dioxide, therefore, a variant of a method provides, when using membranes having low hydrogen/carbon permeation selectivity, the structure of a carbon dioxide-closed permeate mass flow circuit: in which the oxidation of the carbon dioxide and hydrogen-containing permeate mass flow (13) occurring in the case of low hydrogen/carbon permeation selectivity is performed in a solid oxide fuel cell, the hydrogen contained in this mass flow is oxidized to water without the carbon dioxide being able to escape from the permeate mass flow. If the oxidized permeate mass flow (14) thus generated, which escapes from the anode region of the solid oxide fuel cell as an exhaust gas, is returned to the permeate side of the membrane of the membrane reactor (3), the partial pressure for carbon dioxide thus increases there. As a result of the further operation of this cycle, this partial pressure for carbon dioxide increases so much that it is in equilibrium with the partial pressure for carbon dioxide on the retentate side of the membrane of the membrane reactor (3), so that the further diffusion of carbon dioxide from the retentate side to the permeate side of the membrane comes to a complete halt in the balance and thus a carbon dioxide-closed permeate mass flow circuit builds up, which consists of the hydrogen-containing permeate mass flow (13) from the membrane reactor (3) to the solid oxide fuel cell and from the oxidized permeate mass flow (14) of the solid oxide fuel cell to the membrane reactor (3).

The gaseous water generated by the oxidation of hydrogen in the solid oxide fuel cell accumulates in this carbon dioxide-closed permeate mass flow circuit when using molecular sieve membranes (such as zeolite or carbon membranes) which not only have a low hydrogen permeation selectivity with respect to carbon dioxide but also with respect to water, separated from the permeate mass flow circuit by this membrane in the following way: In the course of operation, this carbon dioxide-closed permeate mass flow circuit not only increases the partial pressure of carbon dioxide on the permeate side of the membrane, but also that of the water, so that, as soon as the partial pressure of water in the permeate mass flow circuit is higher than that in the retentate mass flow, there is a diffusion of water from the permeate side to the retentate side of the membrane and thus there is a separation process of water from the permeate mass flow circuit.

If no membrane having low hydrogen permeation selectivity to carbon dioxide and water is used, water can be separated from the permeate mass flow circuit by condensation. This condensed water can then be supplied to the steam generator (2) in order to avoid a loss of carbon within the method by carbon dioxide dissolved in this water.

In a variant of the method, water (16) is condensed out of the retentate mass flow (15) above the ambient temperature before the resulting water-reduced retentate mass flow (15) is fed to step 3 of the method. This condensed water (16) is then fed to step 1 of the method. By reducing the water in the retentate mass flow (15), the available storage space in the storage tank (7) for carbon dioxide can be used more efficiently for carbon dioxide storage. This above-ambient temperature condensation of water can be performed by means of a recuperator which is operated with ambient air or another medium at the temperature level of the environment. The condensed water (16) also contains those components of the retentate mass flow (15) whose partial pressure is also above their respective saturation vapor pressure at the temperature prevailing in the recuperator. Such components may be non-reformed residues of the substance (9) from the group hydrocarbons/ethers/alcohols or by-products of the steam reforming. In particular, non-reformed methanol condenses under conditions similar to those of water. For example, dimethyl ether and formic acid can occur as by-products of methanol steam reforming, which also condense at similar temperatures and partial pressures as water.

In another variant of the method, the residual gas (18) generated in step 3 is supplied to step 1 or step 2 of the method. This residual gas (18) can consist of those residues of the substance (9) from the group hydrocarbons/ethers/alcohols which were not converted in the steam reactor and due to their condensation behavior were not already condensed as described in step 3, also from by-products of the steam reforming (e.g., carbon monoxide) and hydrogen gas, which was not separated in the membrane reactor (2).

In a further variant, the method is performed with such low pressure that the condensation of liquid carbon dioxide (19) in method step 3 and the storage of this liquid carbon dioxide (19) in method step 4 must take place below the ambient temperature. The necessary refrigeration (17) is generated in this variant of the method by means of a sorption cooling method, for example, in an absorption chiller (8) using heat (11) generated in step 5. This refrigeration (17) is then transported via at least one line by means of a refrigerant medium (e.g., ammonia) in the recuperator provided for step 3 and in the storage tank (7) for carbon dioxide provided for step 4. If the condensation and storage temperature of the carbon dioxide is below the solidification temperature of water, then the previously described variant of the method, in which a condensation of water is performed before the condensation of carbon dioxide, there may be an option to perform efficient drying of the retentate mass flow (15) and to thus avoid the formation of water ice in step 3 in the subject variant of the method.

An energy balance analysis also indicates that the amount of heat (11) released in step 5 is sufficient not only for the heat supply of the steam generator (2) in step 1, as shown above, but also for the generation of sufficient refrigeration to perform the condensation of carbon dioxide even at temperatures of −50° C. The energy required to operate an absorption chiller for condensing carbon dioxide from a 30° C. warm retentate mass flow (15) consisting of more than 90% carbon dioxide by cooling to −50° C. is, at a pressure of 6 bar, about 15 kJ per mole of carbon dioxide and thus about 15 kJ per 3 moles of hydrogen, which is released in step 2. The comparison with the amount of heat shown above in the oxidation of 3 moles of hydrogen in step 5 shows that the energy required to generate this refrigeration can be easily obtained from the heat of this method step 5. Likewise, the temperature level of the heat which can be tapped in step 5 when using internal combustion engines and when using certain fuel cells (in particular solid oxide fuel cells) is sufficient to generate refrigeration in a two-stage ammonia absorption chiller at a temperature level of below −50°. The use of a multi-stage absorption cooling method is advantageous, since thereby the waste heat arising in an internal combustion engine at different temperature levels (exhaust gas about 200°-450°, cooling water about 75°-95°) can be used more efficiently for the generation of refrigeration (17).

In an advantageous variant of the method, the substance (9) from the group consisting of hydrocarbons/ethers/alcohols or/and water is used as the refrigerant for said condensation of carbon dioxide or/and for the said condensation of water, and thus preheated or evaporated for use in step 1 of the method.

In order to obtain as dry as possible anhydrous retentate mass flow (15) before step 3, a further condensation of water is performed in a variant of the method between step 2 and step 3, but in contrast to the above said condensation of water, below the ambient temperature and by supplying refrigeration (17), which in turn is generated by means of a sorption method from the heat (11) occurring in step 5. This method step can also be performed in a recuperator.

In summary, the method has the following basic properties: First, in step 5 of the method, mechanical and/or electrical energy is generated. Second, in step 3 and step 4 of the method of the present invention, carbon dioxide is separated in liquid form and stored at high density, and can be used within a carbon-based energy storage system for further synthesis of carbon-containing compounds using the method. Third, the use of membranes having high hydrogen permeation selectivity or the formation of a carbon dioxide-closed permeate mass flow circuit achieves near-complete recovery of carbon from carbon-containing compound (hydrocarbon, alcohol, ether) in the form of carbon dioxide. Thus, the method solves the above-mentioned task, within an energy storage system having a carbon cycle, of almost completely separating carbon contained in a high-energy, carbon-containing compound (hydrocarbon, alcohol, ether) from said compound in the form of carbon dioxide and storing it with high density without performing compression of gases, in particular of carbon dioxide or of carbon dioxide-containing gases.

LIST OF REFERENCE NUMBERS 1 installation for gas compression-free recovery and storage of carbon
2 steam generator for evaporating water and a substance of the group hydrocarbons/ethers/alcohols
3 membrane reactor for the catalytic steam reforming of a substance of the group hydrocarbons/ethers/alcohols and for separating hydrogen gas from the product gas generated by the steam reforming,
4 device for oxidizing hydrogen gas
5 device for condensing water from a water vapor-containing gas mixture
6 device for condensing carbon dioxide from a carbon dioxide-containing gas mixture
7 storage tank for carbon dioxide
8 absorption chiller
9 substance from the group hydrocarbons/ethers/alcohols
10 water
11 heat
12 superheated gas
13 hydrogen-containing permeate mass flow
14 oxidized permeate mass flow
15 retentate mass flow
16 water
17 refrigeration
18 residual gas
19 liquid carbon dioxide

The invention claimed is:

1. An installation for the recovery and storage of carbon in the form of liquid carbon dioxide from substances of the group hydrocarbons/ethers/alcohols, comprising:
 a steam generator for evaporating water and a substance of the group hydrocarbons/ethers/alcohols;
 a membrane reactor for catalytic steam reforming the substance of the group hydrocarbons/ethers/alcohols and for separating hydrogen gas from a product gas;
 a device for condensing carbon dioxide from a gas mixture containing carbon dioxide;
 a storage tank for carbon dioxide;
 a device for oxidizing hydrogen gas, selected from the group of internal combustion engines or from the group of fuel cell systems;

a line for transporting gas at more than 5.18 bar pressure, which connects the steam generator and the membrane reactor;

a line for transporting a retentate mass flow of the membrane reactor at more than 5.18 bar pressure, which connects the membrane reactor and the device for condensing carbon dioxide;

a line for transporting a liquid medium at above 5.18 bar pressure, which connects the device for condensing carbon dioxide and the storage tank for carbon dioxide; and a line which connects the membrane reactor and the device for oxidizing hydrogen gas and which is usable to supply a hydrogen-containing gas to the device for oxidizing hydrogen gas, wherein the steam generator is configured to generate steam having a pressure above 5.18 bar, and the membrane reactor, the device for condensing carbon dioxide, and the storage tank for carbon dioxide are operable at gas pressures of over 5.18 bar, the steam generator has an inlet device for supplying heat and contains a recuperator, the device for oxidizing hydrogen gas is operable at a temperature which is above an operating temperature of the steam generator, and the device for condensing carbon dioxide comprises a recuperator.

2. The installation according to claim 1, wherein the device for oxidizing hydrogen gas comprises a solid oxide fuel cell and is connected by a further line to the membrane reactor, the further line being adapted to supply exhaust gas from an anode region of the solid oxide fuel cell into the membrane reactor.

3. The installation according to claim 1, further comprising a device for condensing water and a line for transporting water, which connects the device for condensing water and the steam generator.

4. The installation according to claim 1, further comprising a gas transport line which connects the device for condensing carbon dioxide to the steam generator or to the membrane reactor.

5. The installation according to claim 1, further comprising:

an absorption chiller;

a tank cooling device arranged within the storage tank for cooling the contents of the storage tank;

a line for transporting a refrigerant medium which connects the absorption chiller and the device for condensing carbon dioxide; and a line for transporting the refrigerant medium which connects the absorption chiller and the storage tank for carbon dioxide.

6. The installation according to claim 5, further comprising at least two devices for condensing water from a water vapor-containing gas mixture and a line for transporting the refrigerant medium between one of at least two devices for condensing water and the absorption chiller.

7. A method for recovering and storing carbon in the form of liquid carbon dioxide from substances of the group hydrocarbons/ethers/alcohols, comprising the following steps:

(1) generating a superheated gas having more than 5.18 bar pressure by evaporating and heating of water and of a substance of the group hydrocarbons/ethers/alcohols in a steam generator to which heat is supplied;

(2) catalytic steam reforming the superheated gas having more than 5.18 bar pressure generated in step (1) and generating a permeate mass flow and a retentate mass flow by separating hydrogen gas from a product gas utilizing a membrane reactor capable of hydrogen separation;

(3) generating a residual gas by condensing carbon dioxide from the retentate mass flow generated in step (2) into liquid carbon dioxide;

(4) storing the liquid carbon dioxide condensed in step (3) in a storage tank for carbon dioxide; and (5) generating heat and electrical and/or mechanical energy by oxidizing the hydrogen gas separated in step (2) at a temperature which is higher than a temperature of the catalytic steam reforming of step (2).

8. The method according to claim 7, wherein heat generated in step (5) is fed into a recuperator arranged within the steam generator.

9. The method according to claim 7, wherein the permeate mass flow generated in step (2) is fed to a solid oxide fuel cell for oxidation of the hydrogen gas contained therein and wherein a resulting oxidized permeate mass flow is returned back to a permeate side of the membrane reactor used in step (2).

10. The method according to claim 7, further comprising condensing water from the retentate mass flow generated in step (2) and supplying the water to the steam generator used in step (1).

11. The method according to claim 7, wherein the residual gas generated in step (3) is supplied to the steam generator used in step (1) or to the membrane reactor used in step (2).

12. The method according to claim 7, wherein condensing carbon dioxide in step (3) and storing the liquid carbon dioxide in step (4) are performed below ambient temperature, and wherein refrigeration is generated by a sorption cooling method using heat generated in step (5) and distributed by a refrigerant medium to support the condensing carbon dioxide step (3) and the storing the liquid carbon dioxide step (4).

13. The method according to claim 12, comprising a first condensation of water from the retentate mass flow generated in step (2) above the ambient temperature and supplying the water to the steam generator used in step (1) and comprising a second condensation of water from the retentate mass flow generated in step (2), following the first condensation, the second condensation being performed below the ambient temperature by using the refrigeration generated by the sorption cooling method and distributed by the refrigerant medium.

* * * * *